(12) United States Patent
Kurata

(10) Patent No.: US 7,320,376 B2
(45) Date of Patent: Jan. 22, 2008

(54) TIRE WHEEL STRUCTURE

(75) Inventor: Fumito Kurata, Toyota (JP)

(73) Assignees: Toyota Jidosha Kabushiki Kaisha, Toyota (JP); Bridgestone Corporation, Tokyo (JP)

(*) Notice: Subject to any disclaimer, the term of this patent is extended or adjusted under 35 U.S.C. 154(b) by 0 days.

(21) Appl. No.: 11/589,794

(22) Filed: Oct. 31, 2006

(65) Prior Publication Data

US 2007/0039771 A1 Feb. 22, 2007

Related U.S. Application Data

(62) Division of application No. 10/932,115, filed on Sep. 2, 2004.

(30) Foreign Application Priority Data

Sep. 12, 2003 (JP) ............................. 2003-320624

(51) Int. Cl.
*B60K 7/00* (2006.01)
(52) U.S. Cl. ..................................... 180/65.5
(58) Field of Classification Search .............. 180/65.5, 180/65.6; 280/93.512, 124.141, 124.134, 280/124.145
See application file for complete search history.

(56) References Cited

U.S. PATENT DOCUMENTS 5,087,229 A  2/1992  Hewko et al.
5,127,485 A  7/1992  Wakuta et al.
5,180,180 A  1/1993  Yamashita et al.

FOREIGN PATENT DOCUMENTS

| JP | A-5-278476 | 10/1993 |
| JP | A-6-48192 | 2/1994 |
| JP | A-9-132040 | 5/1997 |
| JP | A-2000-343920 | 12/2000 |
| JP | A-2004-161157 | 6/2004 |
| WO | WO 02/083446 A1 | 10/2002 |

OTHER PUBLICATIONS

"Instructions for repairing a flexible disk", Mar. 10, 2003.
"Traffic ABC" Hardy Disk, Dec. 18, 2005.

*Primary Examiner*—Lesley D. Morris
*Assistant Examiner*—Bridget Avery
(74) *Attorney, Agent, or Firm*—Oliff & Berridge, PLC

(57) ABSTRACT

A tire wheel structure that avoids the adverse effect of the increase in the unsprung mass associated with the presence of a driving motor at the time of a road surface input to a tire wheel is provided. In the tire wheel structure, the driving motor is disposed near the tire wheel that is supported on a vehicle body. The driving motor drives the tire wheel by transferring driving force to the tire wheel. The output shaft of the driving motor is connected to a wheel of the tire wheel via a flexible coupling. The driving motor is supported by a knuckle member of a suspension via coil springs and absorbers so that the driving motor is relatively displaceable with respect to the tire wheel along a guide that has an axis that is inclined with respect to a vertical axis in a vehicular front-rear direction.

5 Claims, 3 Drawing Sheets

TIRE WHEEL STRUCTURE

INCORPORATION BY REFERENCE

This is a Division of application Ser. No. 10/932,115 filed Sep. 2, 2004. The disclosure of the prior application is hereby incorporated by reference herein in its entirety.

The disclosure of Japanese Patent Application No. 2003-320624 filed on Sep. 12, 2003, including the specification, drawings and abstract is incorporated herein by reference in its entirety.

BACKGROUND OF THE INVENTION

1. Field of the Invention

The invention relates to a tire wheel structure and, more particularly, to a tire wheel structure equipped with a driving motor that is disposed near a tire wheel supported on a vehicle body and that drives the tire wheel by transferring driving force to the tire wheel.

2. Description of the Related Art

Japanese Patent Application Laid-Open Publication No. 6-48192 discloses a related-art tire wheel structure in which a driving motor for rotating a tire wheel is disposed within a wheel of the tire wheel. In this tire wheel structure, a drive shaft of the driving motor is connected to the wheel. Therefore, the tire wheel can be rotated by the torque generated by the driving motor.

In a construction in which the drive shaft of the driving motor is connected to the wheel and the tire wheel is rotated by the driving motor, the mass of the driving motor adds to the unsprung mass of the vehicle. In the aforementioned related-art tire wheel structure, the drive shaft of the driving motor is directly coupled to the wheel so that the driving motor and the tire wheel are integrally fixed to each other. In this structure, therefore, the driving motor is displaced together with the tire wheel as one unit with respect to the vehicle body, at the time of input of a road surface condition to the tire wheel. Thus, an adverse effect of the added unsprung mass becomes conspicuous. Specifically, the road following performance of the tire wheel during running of the vehicle deteriorates, and the passenger riding comfort degrades.

SUMMARY OF THE INVENTION

As an embodiment of the invention, there is provided a tire wheel structure capable of avoiding the adverse effect of an increase in the unsprung mass associated with the presence of a driving motor at the time of a road surface input to the tire wheel. This tire wheel structure includes a tire wheel supported by a vehicle body, and a driving motor that is disposed near the tire wheel and is supported on the tire wheel via a spring element and a damper element so as to be relatively displaceable with respect to the tire wheel, and that drives the tire wheel by transferring driving force to the tire wheel. The driving motor is supported so as to be relatively displaceable with respect to the tire wheel along an axis that is inclined with respect to a vertical axis in a vehicular front-rear direction.

According to this tire wheel structure, the driving motor for driving the tire wheel is supported so as to be relatively displaceable with respect to the tire wheel. Therefore, since the driving motor does not move together with the tire wheel as one unit but is relatively displaceable with respect to the tire wheel, the tire wheel structure avoids, as much as possible, the effect of the increase in the unsprung mass of the vehicle associated with the presence of the driving motor at the time of a road surface input to the tire wheel. Furthermore, since the effect of the increase in the unsprung mass of the vehicle associated with the presence of the driving motor can be avoided at the time of a road surface input to the tire wheel, degradation of passenger riding comfort can be prevented. In the tire wheel structure, the driving motor can be caused to function as a dynamic damper. Hence, the vibrations on the tire wheel can be reduced, and the passenger riding comfort can be improved.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description, the present invention will be described in more detail in terms of exemplary embodiments.

Figure 1:
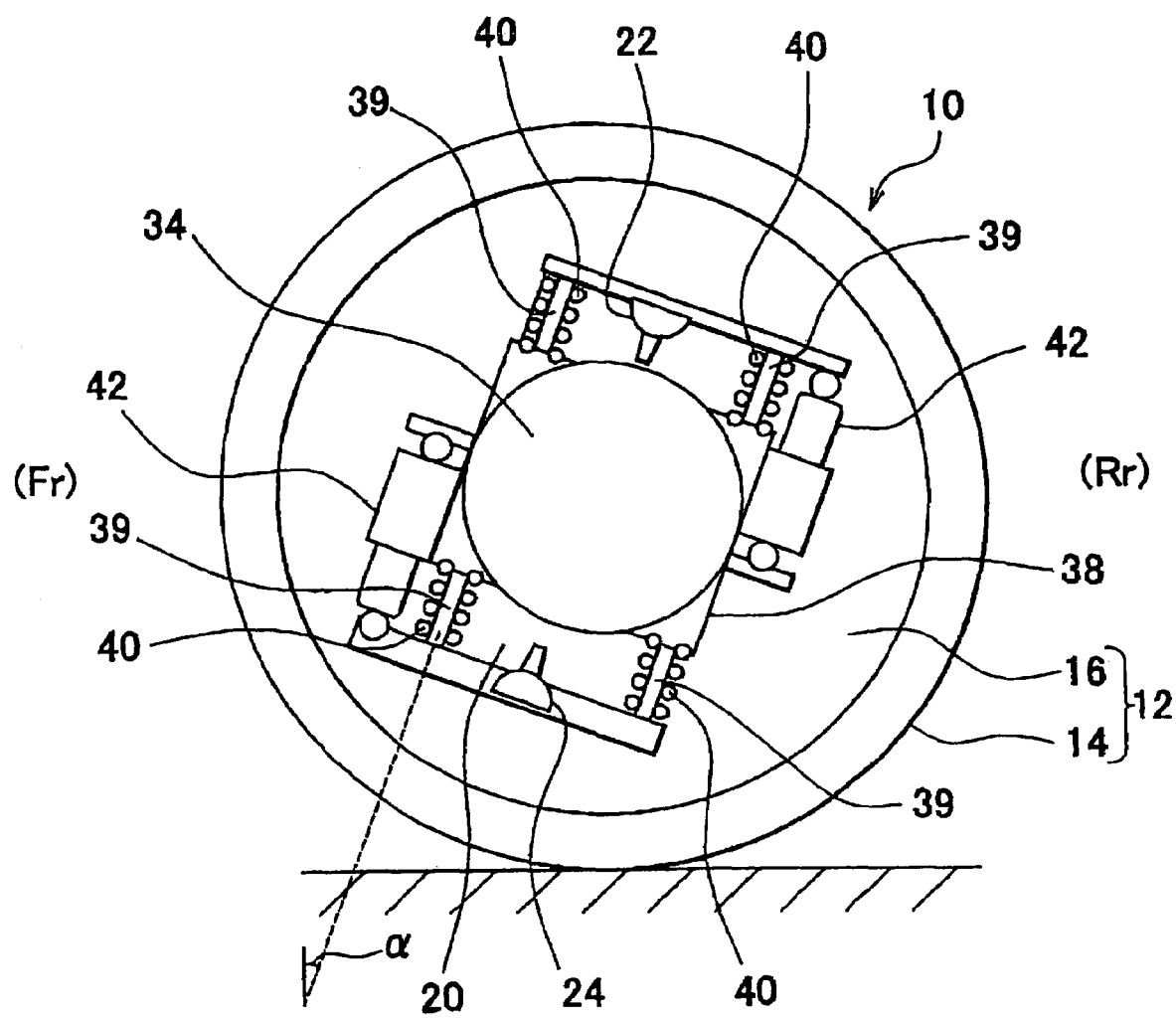
FIG. 1 is a diagram illustrating a construction of a tire wheel structure in accordance with a first embodiment of the invention, viewed from a side of a vehicle.
Figure 2:
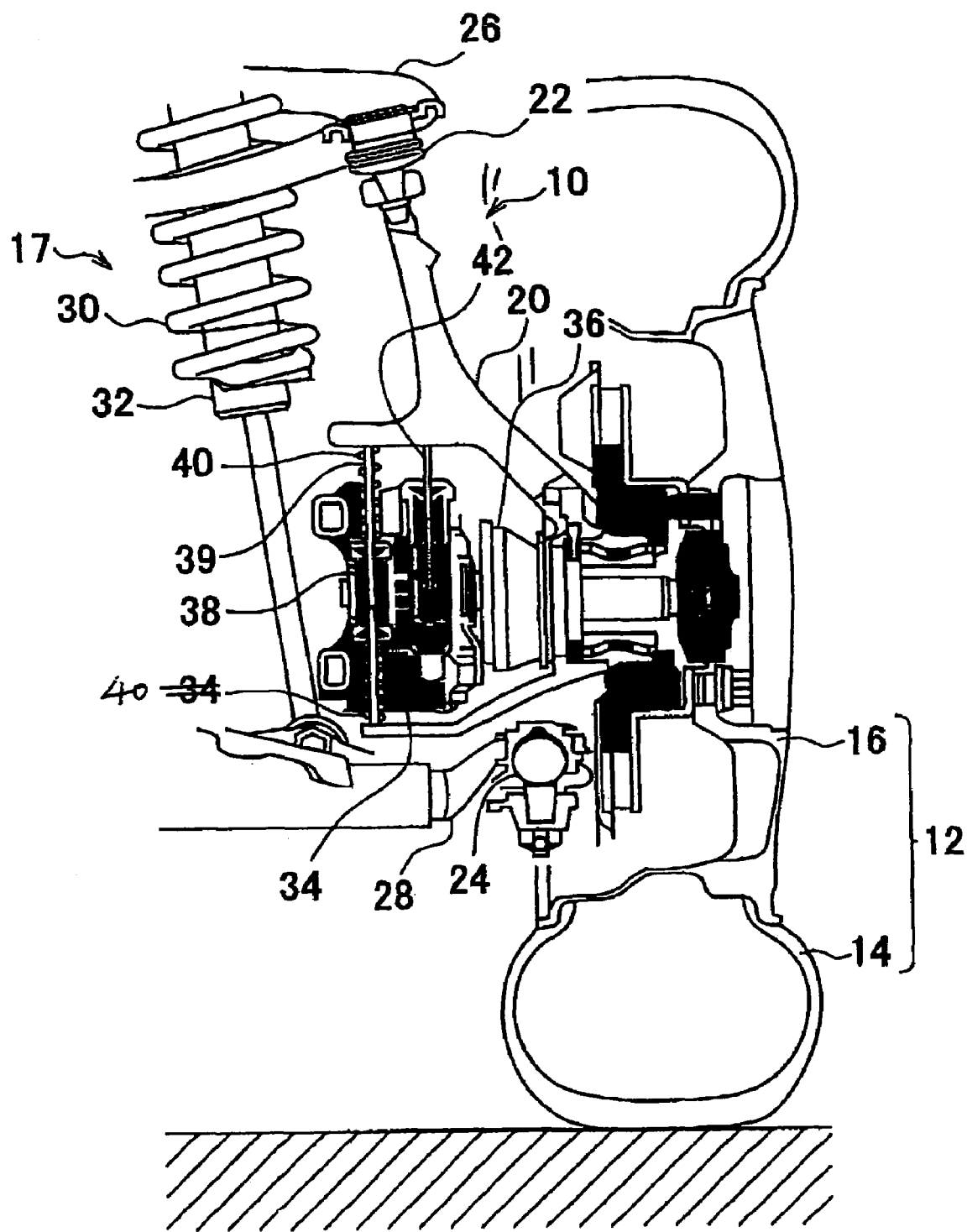
FIG. 2 is a diagram illustrating a construction of the tire wheel structure of the embodiment, viewed from a front of the vehicle.

FIGS. 1 and 2 are diagrams illustrating a construction of a tire wheel structure 10 in accordance with an embodiment of the invention. FIG. 1 shows a view of the tire wheel structure 10 of the embodiment taken from a side of a vehicle. FIG. 2 shows a view of the tire wheel structure 10 of the embodiment taken from a front of the vehicle.

In this embodiment, the vehicle is equipped with the tire wheel structure 10 that includes a tire wheel 12 that is rotated and steered. The tire wheel 12 includes a rubber-made tire 14 that contacts a road surface, and a wheel 16 around which the tire 14 is mounted. A double-wishbone suspension 17 is interposed between the tire wheel 12 and the vehicle body.

The wheel 16 of the tire wheel 12 is rotatably supported by a knuckle member 20 that constitutes the suspension 17. The knuckle member 20 is supported for oscillating movements by suspension arms 26, 28 via suspension ball joints 22, 24. The suspension arms 26, 28 are supported for oscillating movements by the vehicle body or a suspension member (not shown). A coil spring 30 and a shock absorber 32 are interposed between the suspension arm 28 and the vehicle body, and are connected to the suspension arm 28.

The tire wheel structure 10 of this embodiment has a driving motor 34 that is disposed near the tire wheel 12. The driving motor 34 drives the tire wheel 12 by transferring driving force to the tire wheel 12. The driving motor 34 is an electric motor, and rotates when supplied with electric power from a vehicle-mounted electric power source. An output shaft of the driving motor 34 is connected to the wheel 16 of the tire wheel 12 via a flexible coupling (universal coupling) such as an Oldham coupling or the like. Therefore, the driving motor 34 can transfer driving force for rotating the tire wheel 12 to the tire wheel 12 even though the output shaft center of the driving motor 34 is not aligned with the shaft center of the wheel 16, that is, though the output shaft center of the driving motor 34 and the shaft center of the wheel 16 deviates from each other.

The driving motor 34 is mounted on and fixed to a motor mount 38. The motor mount 38 is movably retained to the knuckle member 20 via rod-shaped guides 39. Each guide 39 has an axis that is inclined in a vehicular front-rear direction. Specifically, an upper portion of the axis of each guide 39 is positioned rearward of a vertical axis while a lower portion of the axis is positioned forward of the vertical axis. The axis of each guide 39 has an angle α of, for example, about 10°, with respect a vertical axis.

Coil springs 40 and absorbers 42 are provided as spring elements and damper elements, respectively, between the motor mount 38 and the knuckle member 20. Each coil spring 40 extends along a corresponding guide 39, that is, along an axis that is inclined with respect to a vertical axis in the vehicular front-rear direction. Each coil spring 40 extends surrounding a corresponding guide 39. Each coil spring 40 has an elasticity in such an inclined direction. Each absorber 42 extends parallel to a corresponding guide 39, that is, along an axis of that is inclined with respect to the vertical axis in the vehicular front-rear direction. The absorbers 42 have a characteristic of damping vibrations in such an inclined direction.

Thus, the motor mount 38 and the driving motor 34 are supported elastically via the spring elements and the damper elements by the knuckle member 20, that is, by the tire wheel 12 integrated with the knuckle member 20. Therefore, the motor mount 38 and the driving motor 34 can be relatively displaced with respect to the tire wheel 12 and the suspension (axle) 17 that includes the knuckle member 20, along the axis that is inclined with respect to a vertical axis in the vehicular front-rear direction.

In the construction where the tire wheel 12 is rotated by the driving motor 34 as in this embodiment, the unsprung mass of the vehicle increases by the amount of mass of the driving motor 34. If in that case, the driving motor 34 is not relatively displaceable with respect to the tire wheel 12 in the vehicular front-rear directions and the vehicular up-down direction, but is integrally fixed to the tire wheel 12, the driving motor 34 is displaced together with the tire wheel 12 as one unit with respect to the vehicle body when there is an input from the road surface to the tire wheel 12. Therefore, the performance of the tire wheel 12 in following the road surface during the running of the vehicle deteriorates, and the passenger riding comfort degrades. The increased unsprung mass also causes a conspicuous drawback of degraded maneuverability of the vehicle. Therefore, the tire wheel structure 10 of this embodiment has a feature in avoiding the adverse effect of the increase in the unsprung mass associated with the presence of the driving motor 34 at the time of an input to the tire wheel 12 as mentioned above.

Figure 3:
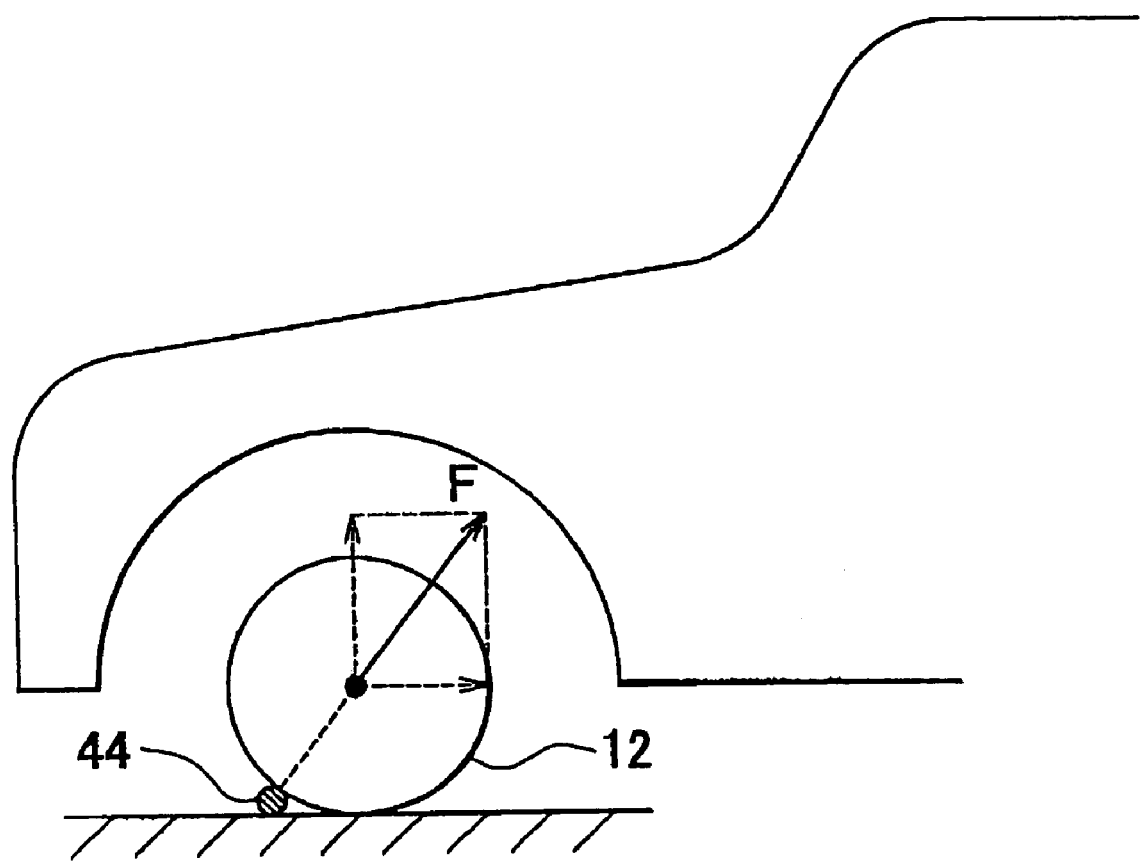
FIG. 3 is a diagram for explaining advantages of the tire wheel structure of the embodiment.

FIG. 3 shows a diagram for explaining an advantage of the tire wheel structure 10 of this embodiment. In the tire wheel structure 10 of the embodiment, the driving motor 34 is supported by the knuckle member 20 and therefore by the tire wheel 12 so as to be relatively displaceable with respect to the tire wheel 12 as described above. Relative displacements of the driving motor 34 with respect to the tire wheel 12 are permitted in a direction along the guide 39, that is, a direction along the axis that is inclined with respect to a vertical axis in the vehicular front-rear direction. Since the driving motor 34 is connected to the tire wheel 12 via the flexible coupling 36, driving force can be transferred from the driving motor 34 to the tire wheel 12 even if the shaft center of the driving motor 34 and the shaft center of the tire wheel 12 deviate from each other. In the aforementioned relative displacement permitted direction, the coil springs 40 and the absorbers 42 extend as spring elements and damper elements, respectively.

In this construction, the driving motor 34 functions as a dynamic damper with regard to the input to the tire wheel 12 from the road surface or the like. Specifically, when the tire wheel 12 moves up and down with respect to the vehicle body, the driving motor 34 is caused to oscillate together with the motor mount 38 as one unit in an up-down direction, and therefore performs a function as a dynamic damper in that direction. When the tire wheel 12 is displaced with respect to the vehicle body in the vehicular front-rear direction, the driving motor 34 is caused to oscillate together with the motor mount 38 as one unit in the vehicular front-rear direction, and therefore performs a function as a dynamic damper in that direction.

As indicated in FIG. 3, when the tire wheel 12 runs over an obstacle 44, such as a stone or the like, the tire wheel 12 receives, on an obstacle-contacting surface, a force F that acts in a diagonally upward direction that is slightly inclined with respect to a vertical axis. In the tire wheel structure 10 of this embodiment, relative displacements of the driving motor 34 with respect to the tire wheel 12 are permitted along an axis that is inclined in the vehicular front-rear direction, with an upper portion of the axis being positioned rearward of a vertical axis and a lower portion of the axis being positioned forward of the vertical axis. In this construction, the direction of the force F input to the tire wheel 12 can be adjusted so as to coincide with the direction of relative displacements of the driving motor 34 with respect to the tire wheel 12, by appropriately setting the angle α of the aforementioned inclined axis with respect to a vertical axis. Therefore, it is possible to effectively realize a dynamic damper effect on the input to the tire wheel 12 in the aforementioned diagonally upward direction.

Incidentally, since the driving motor 34 is connected to the tire wheel 12 via the flexible coupling 36, driving force is precisely transferred from the driving motor 34 to the tire wheel 12.

Since the driving motor 34 is relatively displaceable with respect to the tire wheel 12 in a direction that is inclined with respect to a vertical axis in the vehicular front-rear direction, the driving motor 34 is able to sufficiently function as a dynamic damper for the input to the tire wheel 12 in such an inclined direction. That is, according to the tire wheel structure 10 of this embodiment, when there is an input to the tire wheel 12 from the road surface during the running of the vehicle, the vibrations caused on the vehicle body can be effectively reduced. Therefore, the vehicle passenger riding comfort improves, and the maneuverability of the vehicle improves. Hence, the tire wheel structure 10 of this embodiment is able to avoid, as much as possible, the effect of the increase in the unsprung mass associated with the presence of the driving motor 34 at the time of an input to the tire wheel 12 from the road surface.

In the foregoing embodiment, the coil springs 40 correspond to the "spring element" described in the appended claims, and the absorbers 42 correspond to the "damper element" described in the appended claims.

In the embodiment, the driving motor that drives the tire wheel by transferring driving force to the tire wheel is an electric motor that is rotated by using electric power supplied from the electric power source. However, the invention is not limited to this construction. For example, the driving motor may be a hydraulic motor or an air motor that is mechanically driven by flows of an oil or air.

Furthermore, in the embodiment, the tire wheel structure 10 includes the tire wheel 12 that is steered. However, the invention is also applicable to a tire wheel structure in which the tire wheel is not steered. In this case, the driving motor 34 that drives the tire wheel 12 is supported by unsprung component parts, such as the wheel 16, the suspension (axle), etc., so as to be relatively displaceable with respect to the tire wheel 12.

Still further, although in the embodiment, the suspension is of double wishbone type or of strut type, other types of suspensions may also be used. In such a case, the driving motor 34 that drives the tire wheel 12 is supported by unsprung component parts, such as the wheel 16, the suspension (axle), etc., so as to be relatively displaceable with respect to the tire wheel 12.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A tire wheel structure comprising:
   a tire wheel supported by a vehicle body; and
   a driving motor which is disposed near the tire wheel and which is supported on the tire wheel via a spring element and a damper element so as to be relatively displaceable with respect to the tire wheel, the driving motor driving the tire wheel by transferring driving force thereto, wherein the driving motor is supported so as to be relatively displaceable with respect to the tire wheel along an axis that is inclined with respect to a vertical axis in a vehicular front-rear direction.

2. The tire wheel structure according to claim 1, wherein the spring element is a coil spring, and the damper element is an absorber.

3. The tire wheel structure according to claim 1, wherein the spring element is provided separately from the damper element.

4. The tire wheel structure according to claim 1, wherein an upper portion of the axis is positioned rearward of the vertical axis while a lower portion of the axis is positioned forward of the vertical axis.

5. The tire wheel structure according to claim 3, wherein the spring element is a coil spring, and the damper element is an absorber.

* * * * *